Sept. 24, 1968    A. RODGERS    3,402,691
PRESSURE INDICATOR
Filed June 13, 1967    2 Sheets-Sheet 1
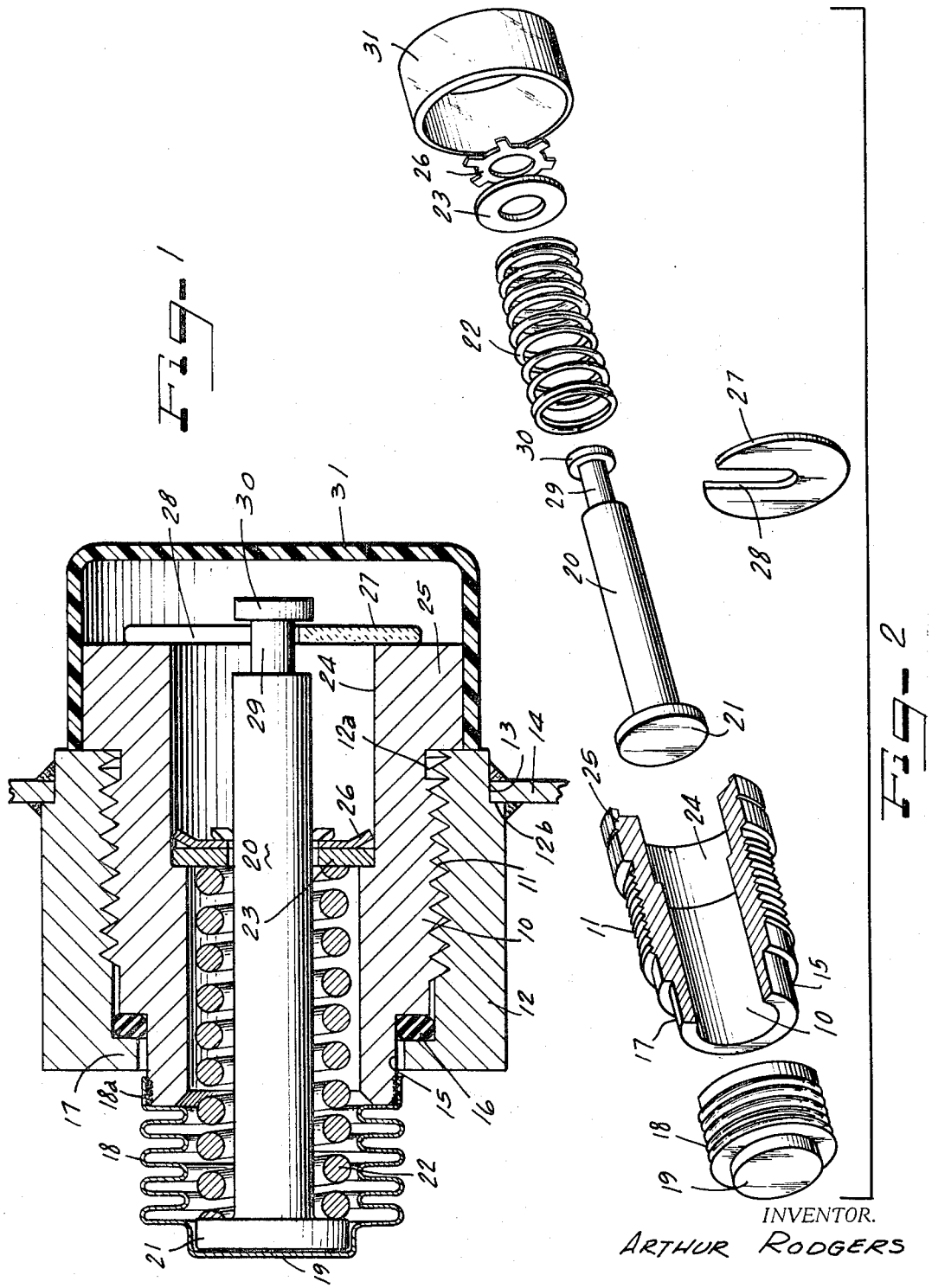
INVENTOR.
ARTHUR RODGERS
BY Hill, Sherman, Meroni, Gross & Simpson
ATTORNEYS

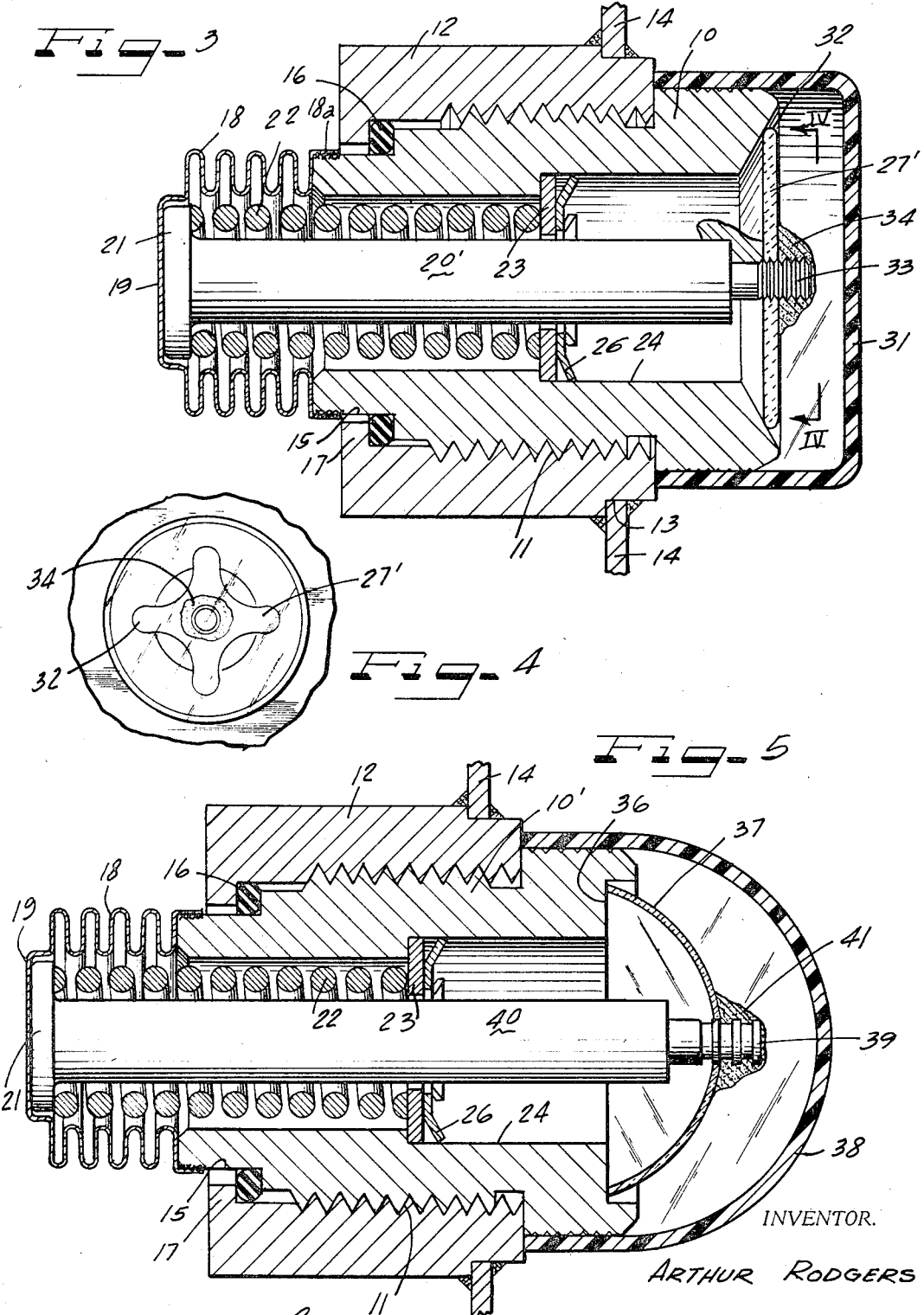

United States Patent Office 3,402,691
Patented Sept. 24, 1968

3,402,691
PRESSURE INDICATOR
Arthur Rodgers, Kenmore, N.Y., assignor to General Fire Extinguisher Corporation, Northbrook, Ill., a corporation of Delaware
Filed June 13, 1967, Ser. No. 645,657
9 Claims. (Cl. 116—70)

ABSTRACT OF THE DISCLOSURE

A fluid pressure indicator having a frangible indicator associated with a spring urged plunger normally restrained from breaking the indicator by a pressure responsive element until a predetermined change in pressure occurs in an adjoining area.

BACKGROUND OF THE INVENTION

Field of the invention

This invention relates to visible type fluid pressure indicators and more particularly to one especially adapted for use with a fluid containing chamber, such as a fire extinguisher tank, and where a visible indication of the pressure in the chamber is desired.

Description of the prior art

Heretofore, various types of visible fluid pressure indicators have been provided for use with fire extinguisher tanks, such, for illustration, as in my own U.S. Patent No. 3,247,824, issued Apr. 26, 1966. However, there is a pressing demand for simpler but yet constantly effective, indicators with the parts thereof greatly reduced in number.

SUMMARY OF THE INVENTION

An object, therefore, of this invention is to provide a simpler, but highly effective, visible type pressure indicator which not only has a substantially reduced number of component parts, but which is more readable and easily understood by the user.

Another object of this invention is to provide a very simple and novel frangible indicator element for a pressure indicator which, when ruptured by a given change in pressure, affords a readily visible indication of a given condition.

In accordance with the general features of this invention, there is provided in a pressure indicator responsive to change in fluid pressure in an adjoining chamber a spring urged plunger, a frangible element associated with the plunger for breakage thereby and a pressure responsive element acting on the plunger for restraining spring movement of the plunger for breaking the element until a predetermined change occurs in the pressure acting on the pressure responsive element.

Other features of the invention relate to the provision of the frangible part of the indicator which may be in any one of three different forms, namely, a slotted disk, a spoked element, or a cupped element; and each of which may be economically made from any suitable brittle glass or ceramic material.

Other objects and features of the invention will more fully appear from the following detailed description taken in connection with the accompanying drawings which illustrate several embodiments thereof.

BRIEF DESCRIPTION OF THE DRAWINGS

FIGURE 1 is a cross-sectional view of one form of the indicator, making use of a slotted frangible part and showing a fragmentary portion, in section, of a chamber or tank wall to which the indicator is attached;
FIGURE 2 is an exploded view of the indicator of FIG. 1 removed from the tank and showing component parts in elevation, except for the main indicator body which is shown broken away and in section;
FIGURE 3 is a cross-sectional view, similar to FIG. 1, but illustrating a modified form or spoked frangible part;
FIGURE 4 is a fragmentary end view showing the spoked frangible part, looking in the direction of the arrows on the line IV—IV of FIG. 3; and
FIGURE 5 is a cross-sectional view, similar to FIG. 1, showing a still third form of the invention making use of a cupped frangible indicator part.

DESCRIPTION OF THE PREFERRED EMBODIMENTS

The indicator has a main tubular or hollow body 10 made of any suitable material such, for example, as brass. The exterior round surface of the body 10 is stepped or shouldered and includes a radially facing threaded portion 11 which is screwed into an internally threaded metal sleeve or collar 12. The collar 12 has a reduced portion 12a providing a collar shoulder 12b. Projecting outwardly through a hole 13 is a wall portion 14 defining a fluid pressure area or chamber as, for example, in a fire extinguisher tank. The sleeve 12 and its portions 12a and 12b are suitably secured at one end to wall portion 14 in position in the hole 13, as by soldering or the like, so as to be a rigid part of the chamber or tank.

Positioned between the other end of sleeve 12 and a reduced end 15 of body 10 is a resilient or rubber sealing ring 16 held in place by an annular end flange or shoulder 17 or collar 12.

An open end of a pressure sensitive element, such as an expansible and contractible brass bellows 18, is secured to reduced body end 15, as by soldering or the like, at 18a. The other end of such bellows is closed at 19 and is adjusted to receive and have bear against it endwise a headed end 21 of a metal or plastic plunger 20 extending through the bore of body 10. Surrounding the plunger 20 inside body 10 and bellows 18 is a compression spring 22. A washer 23 surrounds the plunger inside an elongated and shouldered bore portion 24 of enlarged body portion 25 and is held against one end of spring 22 by a spring lock washer 26 in tight gripping engagement with the internal surface of reduced body portion 24. Thus, the spring is held under compression against the plunger 21 urging it against bellows end 19.

Associated with the other end of plunger 20, beyond the body bore, is a frangible part or disk 27 of material such as brittle glass or a ceramic substance. This disk is slotted at 28 to receive tightly therein a reduced portion 29 of plunger 20 adjoining a plunger enlargement or head 30.

A cupped transparent closure cap 31 of suitable plastic material or the like is removably secured over the enlarged end 25 of body 10. It can be slipped off of the body end 25 when and if desired.

In FIG. 1, the bellows 18 is shown collapsed by pressure of the fluid in the tank or confined area acting thereon. The compression spring, for example, can be calibrated or designed to exert a force against bellows end 19 of about 10% less than and opposite to that of the fluid pressure normally acting on the bellows.

In installing the indicator, the body 10 with the bellows 18 thereon is first screwed into tank sleeve 12. Then, the tank or chamber is pressurized with fluid, thus collapsing bellows 18. Next, the plunger 20 is inserted with the flat end of its head 21 nested in bellows closed end 19. Then, the spring 22 is installed over the plunger 20 and the flat washer 23 and retaining washer 26 are pressed into body bore portion 25 compressing and holding the spring compressed.

The thin brittle frangible part or disk 27 is then dropped over the protruding reduced portion 29 of plunger 20. A drop of viscous quick-drying cement may be then applied to cement these two component parts together. Finally, the transparent cover cap 31 is applied over the body end 25.

Normally, in use, the plunger 20 remains stationary. As the pressure in the tank or chamber slowly drops, a point is reached at which the pressure acting against the bellows 18 in the tank is less than the opposing force of the compressed spring 22 against the bellows 18. When this occurs, the spring 22 expands the bellows through longitudinal movement of plunger 20 which results in plunger head 30 pressing against and breaking or rupturing the frangible part or disk 27. Such ruptured or broken disk 27 is clearly visible through closure cap 31 and affords an indication that the condition of the fluid pressure in the tank has changed or dropped to a point at which the tank should be recharged.

Since in FIGS. 3, 4 and 5 there are illustrated two other modifications of the invention wherein the principal difference over the first forms resides in the frangible part, the same numerals are employed to designated components common to all forms so as to avoid repetition. In instances of change, changed parts have been primed.

In the modification of FIGS. 3 and 4, the principal change is in frangible part 27' which is spoked or star-shaped (FIG. 4) and has its tips 32 bearing against the recessed end surface of indicator body 10. The plunger 20' has its outer end reduced at 33 to receive a frangible part 27', of brittle glass or ceramic material. A drop of viscous quick drying plastic cement 34 fastens frangible part 27' on the threaded plunger end 33.

The principal difference in the form of FIG. 5 is also in frangible part 37 which is cup or dome-shaped, as well as transparent closure cap 38, which is likewise generally dome-shaped. The center of the cupped part 37 is mounted on a reduced end 39 of plunger 40 and is fastened in place with a drop 41 of quick drying plastic cement and with the peripheral edge of part 37 bearing against recessed surface 36 of indicator body 10'.

In all forms, the transparent closure cap is frictionally held on the indicator body so as to be removable for access to the internal parts if and when desired. The assembly of the two modifications is the same as the first form of invention, and further description is believed unnecessary.

Although minor modifications might be suggested by those versed in the art, it should be understood that I wish to embody within the scope of the patent warranted thereon, all such embodiments as reasonably and properly come within the scope of my contribution to the art.

I claim as my invention:

1. In a pressure responsive indicator device comprising:
   a tubular body having an axial bore therethrough,
   a pressure responsive element associated with said body and sealing one end of said bore,
   a plunger in said bore with one end of said plunger operatively connected into said element for movement of said plunger by said element in a given direction, a washer-like member fixed in said bore and concentric with said plunger,
   resilient means associated with said plunger and abutting said washer-like member and said one end of said plunger for moving said plunger in an opposite direction upon a predetermined change in the pressure acting on said element, and
   a frangible element substantially closing the end of said bore opposite said element and operatively associated with the other end of said plunger so that movement of said plunger in said opposite direction will cause said frangible element to break and thereby afford a visible indication of said predetermined change of pressure.

2. The indicator of claim 1 further characterized by said pressure responsive element comprising a hollow collapsible and expensible bellows carried by said body and having said plunger and resiliently urged against an end of the bellows so as to expand same upon a predetermined drop in pressure.

3. The indicator of claim 1 further characterized by said frangible element having a slot therein and said plunger extending through said slot and terminating in an enlarged portion overlying said slot and said frangible element being resiliently urged against said body at said other end of said bore by said plunger.

4. The indicator of claim 1 further characterized by a transparent cap enclosing said other end of said plunger and the frangible element and through which the condition of the frangible element is visible.

5. The indicator of claim 2 further characterized by said frangible element having a slot therein and said plunger extending through said slot and terminating in an enlarged portion, said frangible element being resiliently urged against said body at said other end of said bore by said plunger.

6. The indicator of claim 1 further characterized by said frangible element comprising a spoked element mounted on said other end of the plunger and with the tips of said spoked element tightly bearing against an adjoining portion of said body.

7. The indicator of claim 1 further characterized by said frangible element comprising a cupped element mounted on said other end of said plunger and with the edge of the cupped element tightly bearing against an adjoining portion of said body.

8. In a pressure responsive indicator device comprising:
   a tubular body having a bore,
   a bellows mounted on said body in fluid communication with one end of said bore,
   a plunger in said bore with one end thereof operatively associated with said bellows for movement of said plunger by said bellows in a given direction,
   means in said bore cooperable with said plunger directing movement of said plunger in said bore,
   resilient means associated with said plunger and said means for moving said plunger in an opposite direction to said given direction upon a predetermined change in the pressure acting on said bellows, and
   a frangible element substantially closing the end of said bore opposite said bellows and operatively associated with the other end of said plunger so that movement of said plunger in said opposite direction will cause said frangible element to break thereby afford a visible indication of said predetermined change of pressure.

9. The indicator device of said claim 8 further characterized by a transparent enclosure cap over the frangible element through which said element is visible for observation of its condition.

References Cited

UNITED STATES PATENTS

| 1,311,774 | 7/1919 | Ritter | 137—70 |
| 1,779,065 | 10/1930 | Grant | 137—69 |
| 2,831,492 | 4/1958 | Bising | 137—69 |
| 2,960,096 | 11/1960 | Summers | 137—69 |
| 3,247,824 | 4/1966 | Rodgers | 116—70 |

FOREIGN PATENTS 97,262  10/1937  Sweden.

LOUIS J. CAPOZI, *Primary Examiner.*